Feb. 14, 1961    F. A. WALES    2,971,687
TEA COZY
Original Filed April 5, 1954
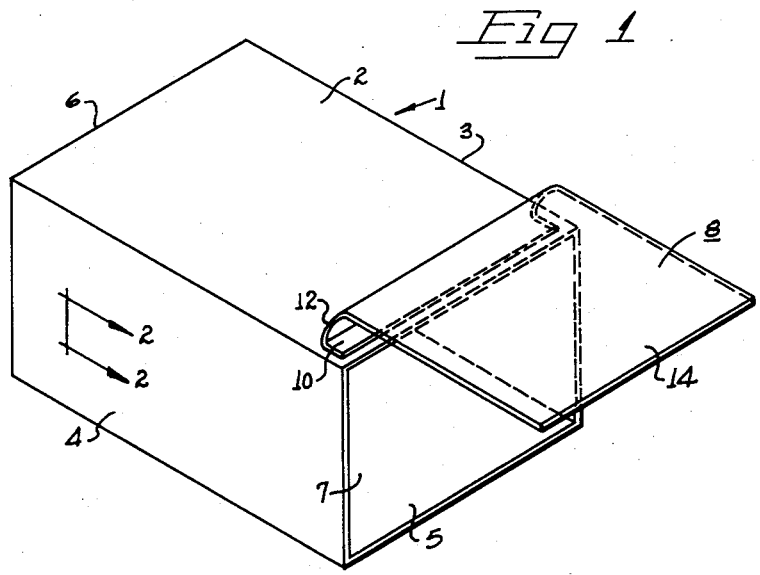
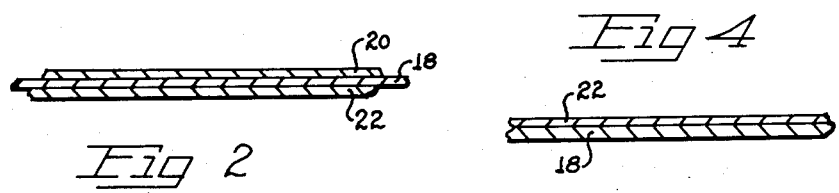
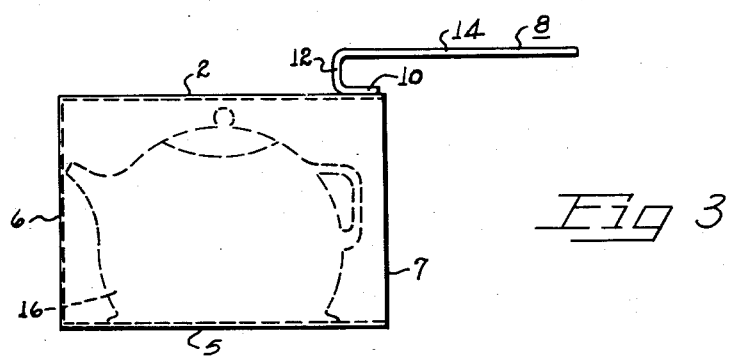
INVENTOR.
FRED A. WALES
BY
SMITH, WILSON, LEWIS & McRAE

United States Patent Office 2,971,687
Patented Feb. 14, 1961

2,971,687

TEA COZY

Fred A. Wales, 31200 Stafford Drive, Birmingham, Mich.

Original application Apr. 5, 1954, Ser. No. 421,146. Divided and this application Oct. 29, 1958, Ser. No. 770,417

1 Claim. (Cl. 229—14)

This application relates to a tea cozy construction and is a division of my application Serial No. 421,146 filed April 5, 1954.

Tea as a beverage is ordinarily prepared by pouring boiling water on the tea leaves in a tea pot and allowing the mixture to stand for a period of three to five minutes, after which the tea beverage is ready for drinking. During the standing period the hot water draws tannin and other water-soluble ingredients from the tea leaves and into the water solution which is used as the beverage. It is the tannin in tea particularly which gives the basic tea flavor desired by tea drinkers.

The solubility of tannin in water decreases rapidly as the temperature of the water is lowered below 200° F. It is necessary therefore in the preparation of a properly brewed beverage tea, to maintain the temperature of the hot water above 200° F. for a sufficient time period, usually about three minutes, so that the optimum amount of tannin is extracted from the tea leaves and is brought into solution to impart the desired flavor to the resultant beverage.

For many years tea connoisseurs have used a tea cozy in brewing tea in order to secure a beverage having the desired flavor and stimulating effect. Such devices usually have been formed of a fabric material in the form of a blanket or covering which surrounds the tea pot and is placed thereon during the infusion of the essential elements from the tea leaves into the water as well as for maintaining a proper temperature level in the pot during this time to assure the optimum infusion into the hot beverage of the water soluble elements from the tea leaves. Such previously known devices usually have been made of spaced layers of cloth or the like in the form of an envelope with a space between the cloth layers filled with thermally insulated material such as cotton, wool, down, or the like.

Such devices are used in and around food and in areas where food is being cooked or prepared. Such devices thus frequently become contaminated by food elements and in addition to being unsanitary also present an unwholesome appearance. In use such devices also absorb moisture from the steam discharged from the tea pot. Such absorption of moisture by the heat insulating materials reduces their efficiency so that the devices are not as fully effective in use as is desired. Such devices in addition to being relatively costly also present the problem of regular laundering to keep them clean. At each laundering some of the heat insulating materials are certain to become caked leaving air voids and spaces between the particles of heat insulating material, and this results in a further loss in thermal efficiency of the unit.

Due to the relatively high cost of such units, it previously has not been practical to provide them on such a basis that they can be readily discarded and new devices used in their place. Also, the nature of the materials from which such devices are formed make them a natural source of food contamination due to the unsanitary condition caused by their use. This to a very large extent has ruled out their use in restaurants and commercial eating establishments where high sanitary standards must be maintained. As a result, the uses of such devices have usually been limited to the home and domestic preparation of tea, with the result that users frequently have remarked of the real difference in flavor between a well-brewed cup of tea in the home and tea as served in the usual restaurant or eating establishment.

It is therefore an object of the present invention to provide a thermally insulated tea cozy in the form of an envelope or cover, either for a multi-cup or a single serving tea pot, which is formed of such materials in such a manner as to permit its use under the most strict sanitary regulations.

A further object of the present invention is to provide a thermally insulated, moisture repellent, relatively inexpensive tea cozy in the form of an envelope or other covering for a tea pot, said envelope or other covering having such thermal insulating properties that when the tea pot is filled with the required amount of tea and brisk boiling water is placed within the tea cozy, the heat lost from the pot will be reduced and the temperature of the mixture of water and tea leaves in the pot will be held in the general range of approximately 200° F. during the critical infusion time of approximately three minutes.

Another object of the present invention is to provide a relatively inexpensive tea cozy formed of durable materials which will permit its use for the intended purpose and yet will provide such a device at a sufficiently low cost that it may readily be discarded when its thermal efficiency is impaired or it becomes unsanitary through use.

It is a further object of the present invention to provide a tea cozy which is adapted for use in restaurants and other commercial food handling establishments where tea is served and in which the tea pot will be maintained at a proper temperature to assure both a well-prepared cup of tea and a hot cup of tea when consumed in the normal course by the user.

It is a further object of the present invention to provide a tea cozy formed of a moisture-repellent, reflective type of insulating material and which is so constructed as to properly insulate a tea pot from rapid heat loss to the surrounding atmosphere and which at the same time will provide an external surface which is attractive in appearance and which may be ornamented in any desired manner and used for the effective display of advertising, directly at the point of consumption.

Other objects of this invention will appear in the following description and appended claims, reference being had to the accompanying drawings forming a part of this specification wherein like reference characters designate corresponding parts in the several views.

In the drawings:

Fig. 1 is a perspective view of one embodiment of the invention showing the tea cozy in position to receive a tea pot therein;

Fig. 2 is a sectional view taken on line 2—2 in Fig. 1;

Fig. 3 is a side view of the Fig. 1 embodiment showing a tea pot in position therein; and Fig. 4 is a sectional view through a multi-ply wall construction which may be utilized in place of the wall construction illustrated in Fig. 2.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the embodiment shown in Fig. 1, the construction there disclosed will be seen to include a housing 1 defined by a top wall 2, side walls 3 and 4, a bottom wall 5, and an end wall 6. The various walls may be formed of a single multi-ply sheet, or the various walls may be formed separately and suitably secured together to define the generally horizontal tube construction shown in the drawings. The open end 7 of the housing is adapted to be closed by a flap 8, said flap including a mounting strip 10, an angularly turned portion 12, and a main flap wall portion 14, said strip 10 being fixedly secured onto top wall 2 of the housing by suitable adhesive.

It will be seen that flap 8 may be turned downwardly from its Fig. 3 open position to a position extending across opening 7 by a simple manual movement, the movement of the flap taking place around an axis located generally at the juncture between strip portions 10 and 12. When flap 8 is turned down to its closed position it closely engages the end edges of walls 2, 3, 4 and 5 so as to cooperate therewith in forming a closed chamber for containing the conventional tea pot 16. The construction of the housing structure and flap 8 is such as to provide a dead air space around the outside surface of tea pot 16 so as to aid in maintaining a high beverage temperature during the tea brewing process.

The housing and flap are preferably formed of a backing ply of waterproof paper 18, to the opposite faces of which are secured sheets 20 and 22 of heat-reflecting metallic material, as for example aluminum. It is contemplated that the backing ply 18 could be formed of materials other than waterproof paper and that the cozy could be formed of a reflective metal sheet without any support, as long as the metal sheet is of sufficient rigidity to support itself. The use of thin metalized heat-reflecting surfaces as formed by thin metal foils is recommended as it is appreciated that such reflecting sheets are extremely thin to reduce the cost thereof. The heat reflecting sheets can be formed of any desired material having a reflectivity which is high enough to reflect the heat rays and also to insulate the covered tea pot sufficiently to maintain the water in the pot above a temperature of approximately 200° F. for a time period of approximately three minutes.

The wall construction shown in Fig. 2 illustrates the wall as formed with one backing ply 18 and two heat-reflecting plys 20 and 22. It is contemplated, however, that the desired temperature can be maintained with but one reflecting surface. Fig. 4 illustrates the use of a backing ply 18 of water-proof paper in combination with a single ply of heat-reflecting aluminum 22. Tests and observations indicate that upwards of 50 percent of the heat loss from the pot is eliminated using the envelope shown in Figs. 1 through 4. When only one reflecting sheet is used as shown in Fig. 4, the heat loss is of course greater than with the Fig. 2 construction, but not high enough to prevent the pot temperature from falling below the desired level for the desired time period.

It will be appreciated that with the illustrated constructions the heat-reflecting insulation effectively maintains the tea pot at the desired temperature and for the time period required to assure correct brewing of the tea. Also, the reflective type of heat insulation provides a moisture repellent covering for the tea pot which is spaced from the sides thereof in such manner as to provide dead air spaces between the pot and the cozy, and which in combination with the reflective surfaces provided in the cozy interior, provides an effective thermal insulation of the pot reducing the heat loss therefrom to such an extent that a temperature in excess of 200° F. will be maintained within the pot for a time period of approximately three minutes. Thereafter, the cozy will serve to retain the temperature of the brewed tea at progressively lower temperatures, but this drop in temperature occurs over a longer period of time than is possible with an exposed tea pot without a cozy, or with a cozy which has lost some of its thermal insulation properties by the absorption of moisture.

It will be observed that the construction herein disclosed is such that the entire unit may be readily constructed and supplied at a relatively low cost which will make it possible for such devices to be widely used and to be discarded as soon as they lose their insulating properties or become unsanitary.

Since the materials used in the construction of the tea cozy herein described are moisture repellent, it will be seen that thermal insulating properties are not impaired by the absorption of moisture from the tea pot, nor are they impaired as is the case with a conventional tea cozy by the repeated launderings which are required to maintain it in a sanitary and wholesome condition. It will be seen also that the tea cozy of the present invention provides a plurality of exposed surfaces which may be ornamented in any desired manner and which may be used for the display of advertising material as desired.

While the embodiments of the invention shown in the drawings contemplate the use of a thin sheet of metal foil which is united with a backing sheet to provide a reflective surface, it is to be understood that other methods of providing the reflective surface may be used without departing from the spirit of the invention. One such method is the painting or spraying of the interior surface of the cozy with a paint or pigment to form a film having high thermal insulation values because of its heat-reflecting characteristics.

I claim:

A tea cozy construction comprising a housing having a bottom wall, a pair of opposed upstanding side walls, and a top wall cooperating together to define a side access opening for insertion of a teapot into the housing interior, the length of the bottom wall normal to the acess opening being at least as great as the spacing between the top wall and bottom wall, whereby the housing is adapted to receive conventional teapots, the walls of said housing being formed of a paper backing layer faced with bright heat-reflective metal on at least one of its surfaces, whereby a teapot located within the housing and having a mixture of initially boiling water and tea leaves is maintained at a temperature above 200° F. for a period of approximately three minutes after the pot is positioned within the housing, said construction further including a flap hingedly carried on the housing top wall and extending downwardly therefrom so as to substantially cover the access opening, said flap being provided with an integrally formed mounting strip carried on the upper surface of the housing top wall, an angularly turned portion extending from said mounting strip in overlapping superjacent relationship thereto, and a main flap portion extending downwardly from said angularly turned portion.

References Cited in the file of this patent

UNITED STATES PATENTS

| | | |
|---|---|---|
| 124,459 | Thurston | Mar. 12, 1872 |
| 2,031,254 | Derr | Feb. 18, 1936 |
| 2,189,055 | Cage | Feb. 6, 1940 |